FIG. 1a

United States Patent [19]

Tezuka

[11] Patent Number: 5,195,037
[45] Date of Patent: Mar. 16, 1993

[54] TORQUE DISTRIBUTION CONTROL SYSTEM FOR A FOUR-WHEEL DRIVE MOTOR

[75] Inventor: Kazunari Tezuka, Niiza, Japan

[73] Assignee: Fuji Jukogyo Kabushiki Kaisha, Tokyo, Japan

[21] Appl. No.: 562,489

[22] Filed: Aug. 3, 1990

[30] Foreign Application Priority Data

Aug. 28, 1989 [JP] Japan .................. 1-222366

[51] Int. Cl.$^5$ .................................. B60K 17/346
[52] U.S. Cl. ..................... 364/426.02; 364/424.05; 180/197; 180/248
[58] Field of Search ........... 364/424.05, 424.1, 426.01, 364/426.02, 426.03, 462.04; 180/197, 248, 249, 250

[56] References Cited

U.S. PATENT DOCUMENTS

| | | | |
|---|---|---|---|
| 4,420,059 | 12/1983 | Suzuki | 180/248 |
| 4,702,341 | 10/1987 | Taga et al. | 180/249 |
| 4,727,966 | 3/1988 | Hiramatsu et al. | 192/0.033 |
| 4,776,424 | 10/1988 | Naito | 180/233 |
| 4,825,368 | 4/1989 | Itoh et al. | 364/424.1 |
| 4,848,508 | 7/1989 | Smirl et al. | 180/248 |
| 4,966,249 | 10/1990 | Imaseki | 180/233 |
| 4,989,686 | 2/1991 | Miller et al. | 180/197 |

FOREIGN PATENT DOCUMENTS

| | | |
|---|---|---|
| 62-55228 | 3/1987 | Japan . |
| 62-261539 | 11/1987 | Japan . |
| 62-283021 | 12/1987 | Japan . |
| 63-8026 | 1/1988 | Japan . |
| 63-57334 | 3/1988 | Japan . |

*Primary Examiner*—Parshotam S. Lall
*Assistant Examiner*—Collin W. Park
*Attorney, Agent, or Firm*—Martin A. Farber

[57] ABSTRACT

A central differential is provided for distributing an output torque of a transmission to front wheels and rear wheels of a vehicle. A fluid-operated restricting device is provided for restricting the differential operation of the central differential. The central differential is arranged to distribute a larger torque to the rear wheels than to the front wheels. A slip ratio of the rear wheels is calculated in dependency on rear-wheel speed and vehicle speed. The fluid-operated restricting device is operated in accordance with the slip ratio, in such a manner that the restricting magnitude increases with an increase of the slip ratio.

4 Claims, 5 Drawing Sheets

TORQUE DISTRIBUTION CONTROL SYSTEM FOR A FOUR-WHEEL DRIVE MOTOR

BACKGROUND OF THE INVENTION

The present invention relates to a torque distribution control system for a four-wheel drive motor vehicle having a central differential, and more particularly to a control system in which output torque of a transmission is unequally distributed to front wheels and rear wheels in accordance with driving conditions.

In a full-time four-wheel drive motor vehicle with the central differential, a fluid operated multiple-disk friction clutch is provided for restricting differential operations. The torque distributed to the front wheels and the rear wheels is controlled by controlling clutch torque of the friction clutch, thereby improving straight-ahead stability, accelerability and driveability. In order to widely control the distribution of the torque, it is necessary that the central differential is arranged to unequally distribute the torque to the front wheels and the rear wheels. There are two methods in the unequal distributing system. One of the methods is a front-weighted distribution which is weighted to the front wheels, and the other is a rear-weighted distribution which is weighted to the rear wheels. In the front-wheel weighted system, larger torque is transmitted to the front wheels. Accordingly, in the front-weighted system, although the vehicle has good straight-ahead stability, it is inferior in steerability because of drifting out of a course. In the rear-wheel weighted system, larger torque is transmitted to the rear wheels. The vehicle has good steerability and driveability on a dry road. However, the vehicle is liable to spin on a slippery road.

On the other hand, a disadvantage of the four-wheel drive vehicle is that all the four wheels may slip (slipping spin) at the same time, causing difficulty in driving.

In order to ensure driving stability of the vehicle, the torque to the rear wheels is set to a larger value than that to the front wheels, so that the rear wheels may slip first. Thus, the vehicle can be safely driven without a sudden change of driving stability (i.e. there is no slipping of the four wheels.).

Since the driving force (acceleration force) is distributed to the four wheels, each wheel can sustain a larger side force. Thus, in order to ensure driving stability in the rear-wheel weighted system, it is necessary to keep the sustainable side force of the rear wheels large.

The driving force and the side force change with the slip ratio of the wheel to the ground (slip ratio is described hereinafter in detail). The slip ratio changes in accordance with the condition of the road surface and the friction coefficient of the tire. In particular, if the slip ratio is larger than a predetermined value (10 to 20%), the driving force and the side force remarkably decrease, which results in deterioration of the driving stability. Accordingly, the slip ratio of the rear-wheels is controlled so as not to exceed the predetermined value. If the system operates to increase the torque distributed to the front wheels in accordance with the reduction of the sustainable side force, the slipping of the rear wheels is prevented to ensure the driving force. Therefore, it is desirable to control the torque distribution based on the rear-wheel slip ratio.

Japanese Patent Applications Laid-Open 62-55228, 62-261539 and 63-8026 disclose four-wheel drive control systems in which a central differential comprising a simple planetary gear device is provided. A standard torque to the front and rear wheels is unequally distributed at a ratio determined by a difference between the pitch circles of gears of the planetary gear device. Torque capacity of the clutch is controlled in accordance with the difference between the speeds of the front wheels and the rear wheels, or with a predetermined value corrected by vehicle speed and steering angle.

It is not advantageous to control the torque distribution under all driving conditions in the same manner. It is desirable to set the torque distribution ratio at a predetermined fixed value under a predetermined driving condition.

Japanese Patent Application Laid-Open 62-283021 discloses a control system in which a torque for restricting the differential operation of the central differential is provided for improving the response of the control operation. Japanese Patent Application Laid-Open 63-57334 discloses a control system in which the torque for operating a differential operation restricting clutch is kept to a predetermined value at deceleration and a predetermined low value when an antilock brake system (ABS) is operated.

However, in the conventional systems, the standard torque distribution ratio determined by the ratio of the pitch circles can not be changed, unless the diameters of the gears change. However, it is difficult to change the diameters because of a limitation of space. Since the distribution of torque to the rear wheels can not be set to a large value, the control range of the torque distribution is small.

Further, the torque distribution is controlled by restricting the differential operation of the central differential. Therefore, slip conditions of the wheels on the road surface can not be detected so that it is impossible to actively control the torque distribution in accordance with the slip conditions. In addition, if the vehicle is driven on a road surface having a low coefficient of friction under slipping conditions and the speed difference is small, the torque distribution can not be controlled.

Further, in the conventional systems for the fixed torque distribution control, the control range of the driving conditions is limited to a particular condition such as deceleration. Therefore, it is desirable to control the distribution at a fixed ratio in a wide range of driving conditions including acceleration and steering operation.

SUMMARY OF THE INVENTION

An object of the present invention is to provide a torque distribution control system for a four-wheel drive motor vehicle in which a large torque is distributed to the rear wheels, thereby enabling control of the torque distribution in a wide range.

Another object of the present invention is to provide a system which may ensure driveability, driving stability and steerability in accordance with slip conditions.

According to the present invention, there is provided a system for controlling torque distribution to the front wheels and rear wheels of a motor vehicle having a transmission, a central differential for distributing output torque of the transmission to the front wheels and the rear wheels of the vehicle, and a fluid-operated restricting device for restricting differential operation of the central differential so as to change the distribution ratio to the front wheels and the rear wheels.

The system comprises the central differential being arranged to distribute a larger torque to the rear wheels than to the front wheels, calculator means for calculating a slip ratio of the rear wheels, means for determining restricting torque of the fluid-operated retstricting device to a value which increases with an increase of the slip ratio, determining means provided to determine vehicle driving conditions for fixing the distribution ratio and for producing a fixed signal, correcting means responsive to the fixed signal for correcting the restricting torque to a predetermined fixed restricting torque for each driving condition, and control means responsive to the fixed restricting torque for operating the fluid-operated restricting device.

In an aspect of the invention, the determining means determines rapid acceleration of the vehicle, and the correcting means corrects the restricting torque to a maximum value at a determined rapid acceleration.

Furthermore, the determining means determines a steady high speed driving, and the correcting means corrects the restricting torque to zero at a determined steady high speed driving.

Other objects and features of this invention will become understood from the following description with reference to the accompanying drawings.

BRIEF DESCRIPTION OF DRAWINGS

FIGS. 1a and 1b are schematic diagrams showing a power transmission system for a four-wheel drive motor vehicle according to the present invention;

DETAILED DESCRIPTION OF THE PREFERRED EMBODIMENTS

Figure 1B:
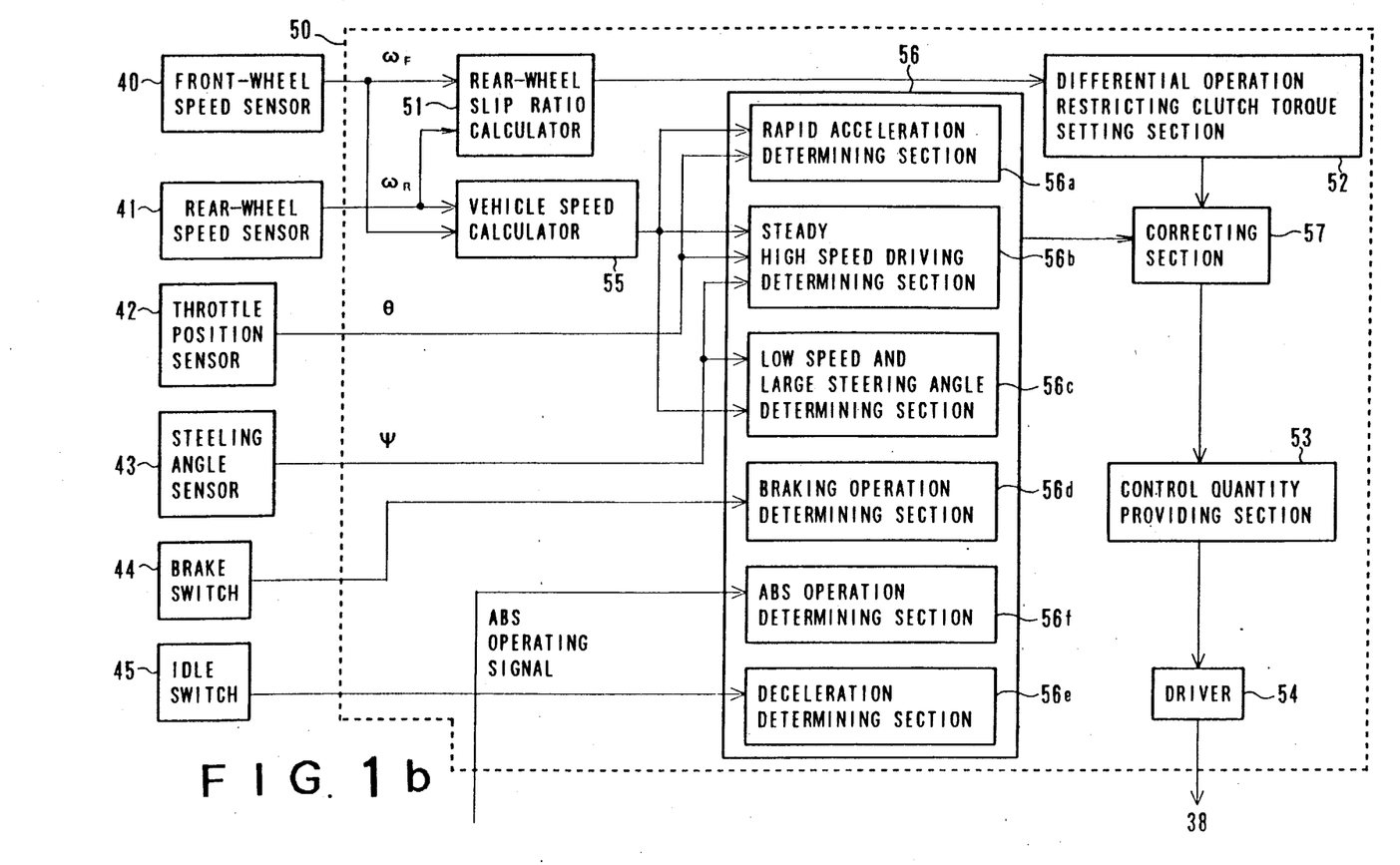

FIG. 1 shows a power transmission system for a four-wheel drive motor vehicle having a central differential according to the present invention. An engine 1 is mounted on a front portion of the vehicle. A clutch 2 and an automatic transmission 3 are disposed at the rear of the engine 1 in the longitudinal direction of the vehicle. The output of the automatic transmission 3 is transmitted to an output shaft 4 which is aligned with a central differential 20 for rearwardly transmitting the torque. The output shaft 4 is connected to a front drive shaft 5 which is disposed in parallel under the automatic transmission 3 through a pair of reduction gears 25 and 26 of the central differential 20. The front drive shaft 5 is connected to front wheels 9 of the vehicle through a front differential 7 and axles 8. The output shaft 4 is connected to a rear drive shaft 6 through the central differential 20. The rear drive shaft 6 is connected to rear wheels 13 of the vehicle through a propeller shaft 10, a rear differential 11 and axles 12.

The central differential 20 is a complex planetary gear device and comprises a first sun gear 21 integrally formed on the output shaft 4, a second sun gear 22 integrally formed on the rear drive shaft 6, and a combined planetary pinion 23 comprising a first planetary pinion 23a meshed with the first sun gear 21, and a second planetary pinion 23b meshed with the second sun gear 22, and supported on a carrier 24. The carrier 24 is connected to the reduction drive gear 25.

Thus, the output torque from the output shaft 4 of the transmission 3 is transmitted to the carrier 24 and the second sun gear 22 through the first sun gear 21 and the pinions 23a, 23b at predetermined respective torque distribution ratios. The difference between rotating speeds of the carrier 24 and the second sun gear 22 is absorbed by rotation of the first and second planetary pinions 23a and 23b.

In the central differential 20, the first sun gear 21 is engaged with the first planetary pinion 23a and the second sun gear 22 is engaged with the second planetary pinion 23b.

Consequently, the standard torque distribution for a front torque $T_F$ and a rear torque $T_R$ can be set to various values by changing radii of pitch circles of the sun gears 21 and 22 and the pinions 23a and 23b.

Thus, the torque distribution ratio of the front wheels 9 to the rear wheels 13 is determined, for example as $$T_F : T_R = 34 : 66$$

A large standard torque can be distributed to the rear wheels 13.

A fluid operated multiple-disk friction clutch 27 is provided adjacent the central differential 20 for resricting the differential operation of the central differential 20.

The clutch 27 comprises a drive drum 27a secured to the carrier 24, and a driven drum 27b secured to the rear drive shaft 6. When a differential operation restricting clutch torque Tc is produced in the clutch 27, a part of the output torque of the second sun gear 22 is transmitted to the front wheels 9, thereby changing the distribution of the torque. The carrier 24 is coupled with the second sun gear 22 when the clutch 27 is entirely engaged, thereby locking the central differential 20.

In the four wheel drive motor vehicle with the front-mounted engine, a static weight distribution of a front static weight WF and a rear static weight WR are determined for example as $$WF : WR \approx 62 : 38$$

when the clutch is directly engaged, the distribution ratio of the front torque to rear torque is 62:38, which is equal to the dynamic weight distribution. Thus, the torque distribution is controlled in a range between the standard torque distribution weighted to the rear wheels 13 and the torque distribution at the complete engagement of the clutch 27 in accordance with clutch torque Tc.

A hydraulic circuit of a control system for the clutch 27 comprises an oil pump 30, a pressure regulator valve 31, a pilot valve 35, a clutch control valve 33 and a solenoid operated duty control valve 38. The regulator valve 31 operates to regulate the pressure of oil supplied from the oil pump 30 driven by the engine 1 to produce a line pressure and the line pressure is applied to a line pressure conduit 32. The conduit 32 is communicated with a passage 37 through the pilot valve 35. The passage 37 is communicated with the solenoid operated duty control valve 38 downstream of an orifice 36, and with an end of the clutch control valve 33 through a passage 39. The conduit 32 is communicated with the clutch control valve 33 through a passage 32a. The clutch control valve 33 is communicated with the clutch 27 through a passage 34. The solenoid operated valve 38 is operated by pulses from a control unit 50 at a duty ratio determined therein, thereby controlling draining of the oil to provide a control pressure. The control pressure is applied to the clutch control valve 33 to control the oil supplied to the clutch 27 so as to control the clutch pressure (torque) and hence the clutch torque Tc.

Describing an electronic control system, a principle for controlling the torque distribution is described hereinafter.

Figure 2A:
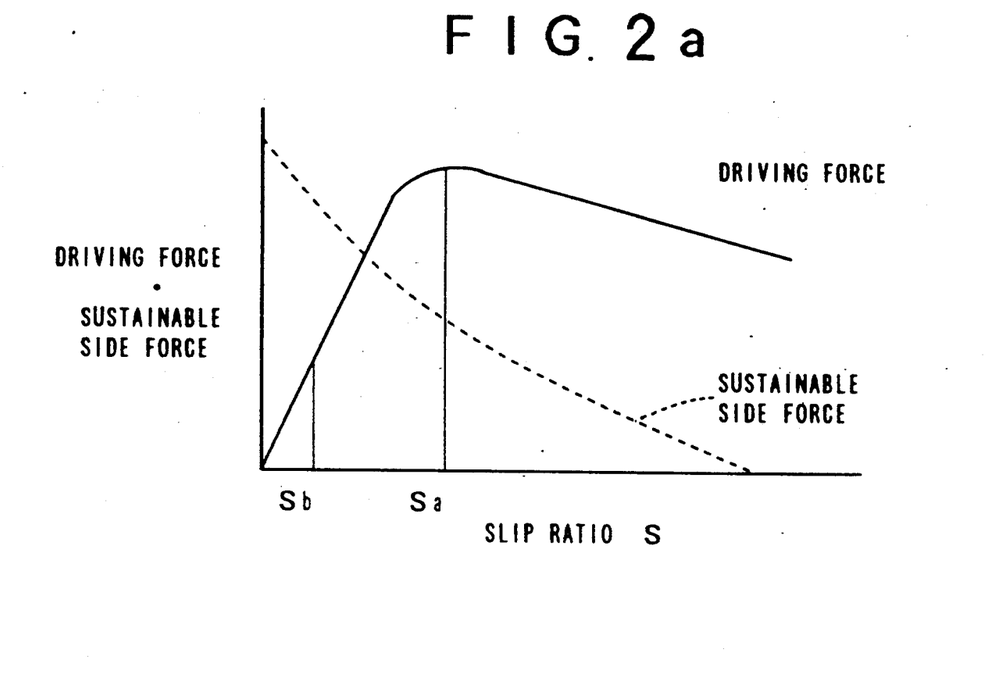
FIG. 2a is a graph showing characteristics of driving force and side force corresponding to slip ratio.

The torque distribution is controlled by a feedback control based on the slip ratio of the rear wheels 13 because the torque $T_R$ to the rear wheels 13 is set to a value larger than that to the front wheels 9 by arranging the central differential 20 so that the rear wheels 13 slip first. FIG. 2a shows relationships between a driving force T and a sustainable side force F corresponding to the slip ratio S. When the slip ratio S is zero, the sustainable side force F is maximum and gradually reduces as the slip ratio S increases. The driving force T increases with the slip ratio S, and the force T reduces when the slip ratio S exceeds a predetermined slip ratio Sa (10 to 20%). Thus, it will be seen that if the slip ratio S is controlled in the range of $S \leq Sa$, a large sustainable side force F is ensured, thereby providing driving stability by rear-wheel weighted driving.

The slip ratio S of the rear wheels 13 is represented as follows with the vehicle ground speed V, the radius of a tire r, and the rear-wheel angular velocity $\omega R$.

$$S = (r \cdot \omega R - V)/(r \cdot \omega R)$$

If the rear-wheel slip ratio S is controlled in a linear range of $S < Sa$ at a torque distribution 3:7, the front-wheel slip ratio S becomes small to be approximately equal to the vehicle speed. Namely, the ground speed V is $$V \approx r \cdot \omega F$$

where $\omega F$ is the front-wheel angular velocity and r is the radius of the tire. Thus, the slip ratio S of the rear wheels 13 is represented as follow.

$$S = (r \cdot \omega R - r \cdot \omega F)/(r \cdot \omega R)$$

$$= (\omega R - \omega F)/\omega R$$

In order to prevent a malfunction of the central differential 20 at cornering, a smaller range than that of a slip ratio Sb (for example 3%) is determined as a dead zone where an apparent slip ratio produced in accordance with the difference between the speed of the front wheels 9 and the speed of rear wheels 13 at a maximum steering angle is included. Thus, the control range becomes $Sb < S < Sa$. The slip ratio S is calculated within the control range to control the clutch torque Tc as an increasing function of the slip ratio S, so that a small amount of the torque Tc to the rear wheels 13 is transmitted to the front wheels 9. Consequently, the sustainable side force F of the rear wheels 13 can be increased.

The control unit 50 is supplied with output signals from a front-wheel speed sensor 40 and a rear-wheel speed sensor 41. The control unit 50 has a slip ratio calculator 51 to which the front-wheel angular velocity $\omega F$ and the rear-wheel angular velocity $\omega R$ from the sensors 40 and 41 are applied. In the slip ratio calculator 51, the slip ratio S is calculated in accordance with the above mentioned equations. The slip ratio S is applied to a clutch torque setting section 52. In accordance with the input signal, the clutch torque setting section 52 retrieves the clutch torque Tc from a look-up table.

Figure 2B:
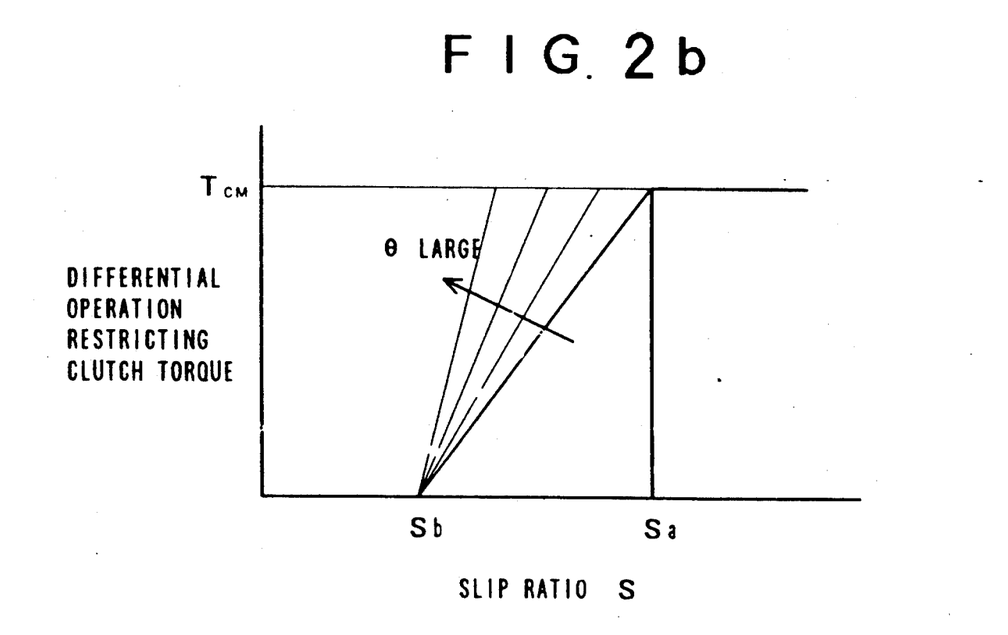
FIG. 2b is a graph showing differential operation for restricting clutch torque.

FIG. 2b shows clutch torque Tc stored in the look-up table. The clutch torque Tc is an increasing function of the slip ratio S in the control range $Sb < S < Sa$.

The clutch torque Tc is applied to a control quantity providing section 53 through a correcting (torque resetting) section 57, where a duty ratio D corresponding to the derived clutch torque Tc is provided. A duty ratio D provided at the section 53 is applied to the solenoid operated duty control valve 38 through a driver 54.

The system is further provided with a throttle position sensor 42, a steering angle sensor 43, a brake switch 44, and an idle switch 45 for the fixed distribution control. The control unit 50 is provided with a vehicle speed calculator 55 to which the front-wheel and rear-wheel angular velocities $\omega F$ and $\omega R$ are applied. Output signals of these sensors and switches, and the vehicle speed V are applied to a condition determining section 56 for deciding a fixed distribution. The fixed distribution determining section 56 has rapid acceleration determining means 56a, steady high speed driving determining means 56b, large steering angle determining means 56c at a low speed driving, braking operation determining means 56d and deceleration determining means 56e. In accordance with a throttle opening degree $\theta$, a steering angle $\psi$, the output signals of the switches 44 and 45, and the vehicle speed V, the driving conditions are determined in the section 56 for the fixed distribution. Further, ABS operation determining means 56f is provided in the section 56. The output signal of each determining means 56a~56f is applied to the correcting section 57 to which the signal from the clutch torque setting section 52 is also applied. The correcting section 57 corrects (resets) the torque distribution corresponding to the driving condition and maintains the corrected torque distribution.

Figure 3:
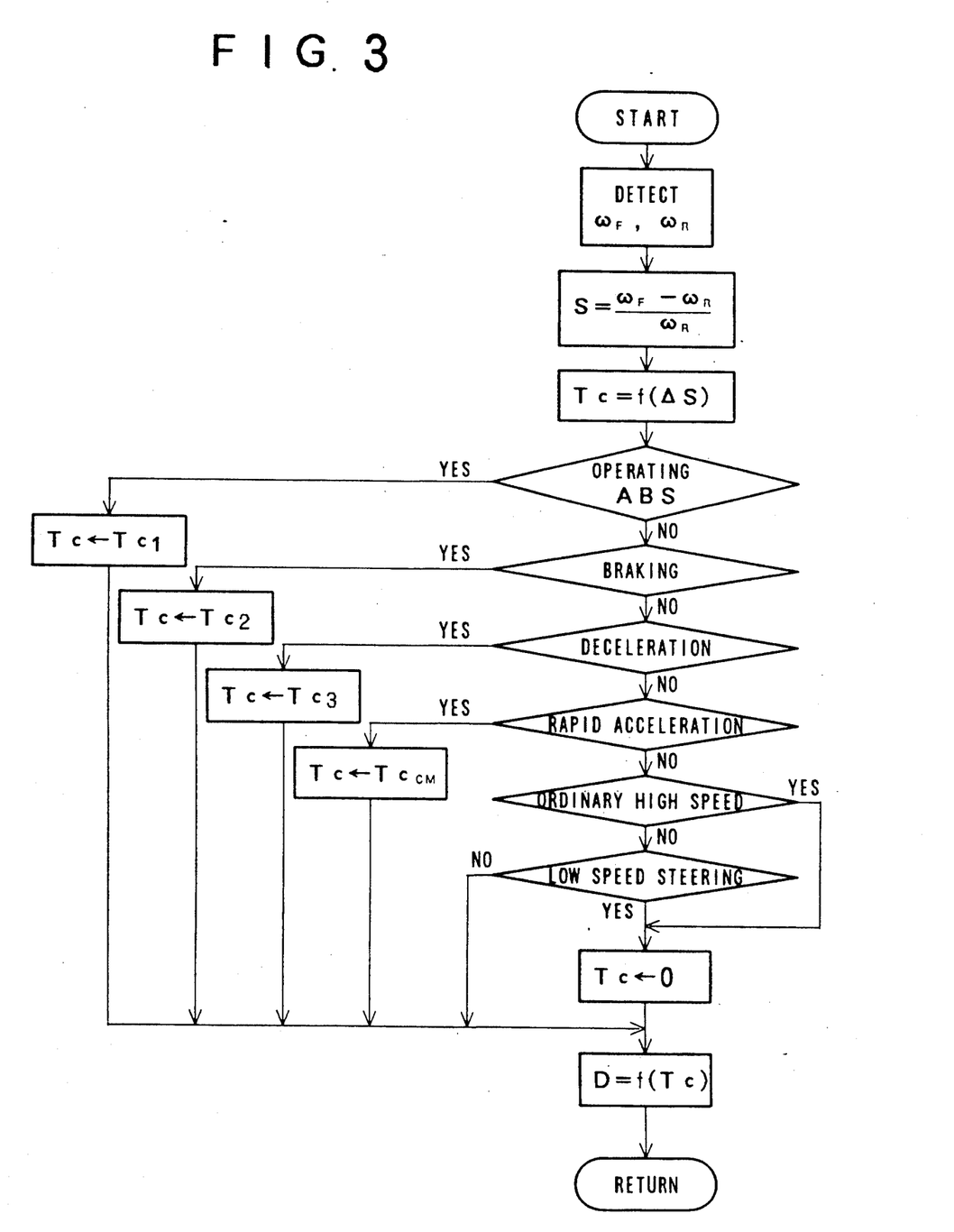
FIG. 3 is a flowchart showing operations of a control unit in the system.
Figure 4A:
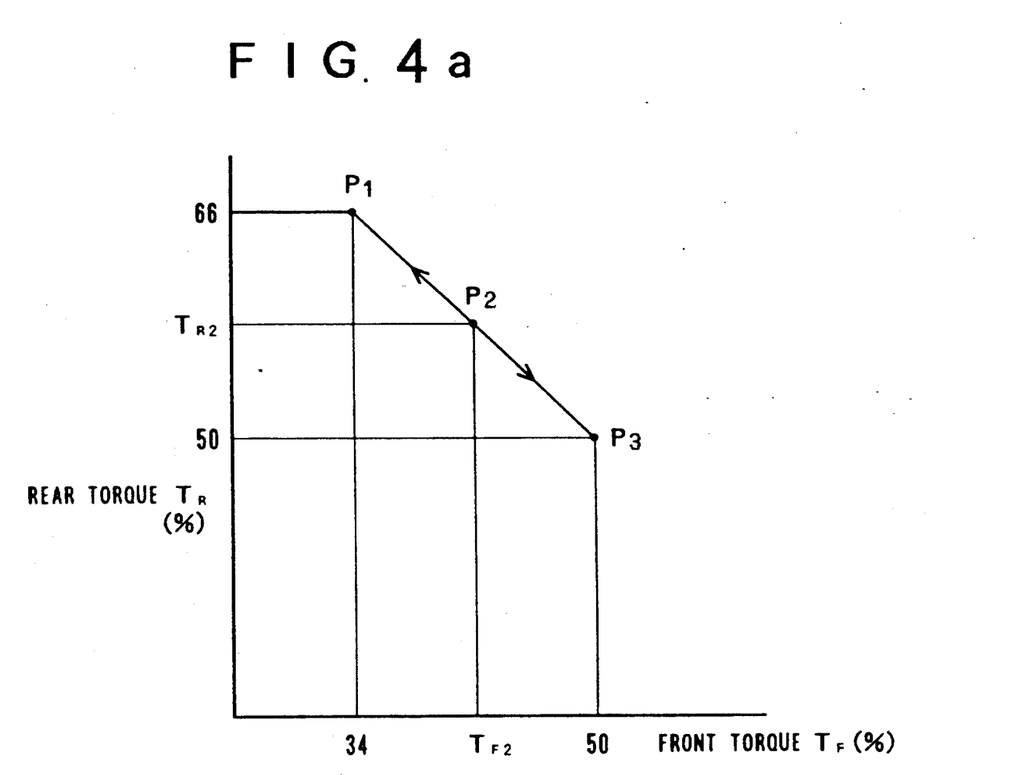
FIG. 4a is a graph showing a relationship between front-wheel torque and rear-wheel torque.
Figure 4B:
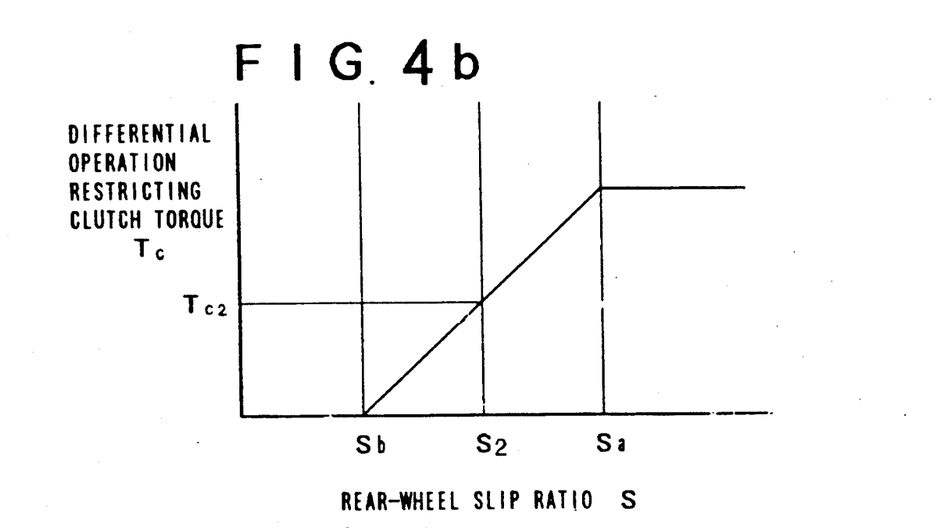
FIG. 4b is a graph showing characteristics of the differential operation for restricting the clutch torque in accordance with a rear-wheel slip ratio.

The operation of the system will be described hereinafter with reference to the flowchart of FIG. 3 and the graphs of FIGS. 4a, 4b. The power of the engine 1 is transmitted to the transmission 3 through the clutch 2 at which the transmission ratio is automatically controlled. The output of the transmission is transmitted to the first sun gear 21 of the central differential 20. The front torque $T_F$ and the rear torque $T_R$ are determined in accordance with the radii of the gears of the central differential 20. The torque is transmitted to the reduction gear 25 through the carrier 24 at a ratio of 34% for example and to the second sun gear 22 at the ratio of 66%.

The front-wheel angular velocity $\omega F$ and the rear-wheel angular velocity $\omega R$ are detected by the front-wheel speed sensor 40 and the rear-wheel speed sensor 41. The rear-wheel slip ratio S is calculated in the rear-wheel slip ratio calculator 51 in accordance with the front-wheel angular velocity $\omega F$ which approximates the vehicle speed.

If a no slip state ($S \leq Sb$) is detected in the control unit 50 while the vehicle is driven on the dry road having a high friction coefficient $\mu$, the clutch torque Tc is determined as zero. A signal corresponding to a large duty ratio is applied to the solenoid operated duty control valve 38. Thus, the clutch control pressure becomes zero and the clutch control valve 33 operates to close the passage 32a, thereby draining the oil from the clutch 27. The clutch 27 is disengaged and the clutch torque Tc becomes zero so as to render the central differential 20 free.

Accordingly, the torque of the reduction drive gear 25 is transmitted to the front wheels 9 through the reduction driven gear 26, the front drive shaft 5 and the front differential 7 at the ratio of 34%. The torque at distribution ratio of 66% is transmitted to the rear wheels 13 through the second sun gear 22, the rear drive shaft 6, the propeller shaft 10 and the rear differential 11. Thus, a full-time four-wheel driving is established at a point P1 of FIG. 4a.

When the vehicle makes a turn, the difference in speeds of the front and rear wheels 9, 13 is absorbed by the rotation of the first and second pinions 23a and 23b, so that the vehicle smoothly negotiates a sharp corner as a result of the differential operation of the central differential 20.

If the vehicle is driven on a slippery road, the rear wheels 13 slip first because the larger amount of the torque is distributed to the rear wheels 13. If the calculated rear-wheel slip ratio reaches a value S2 in the control range, the driving of the rear wheels 13 is unstable. Therefore, a differential operation restricting clutch torque T2 is determined corresponding to the slip ratio S2. Consequently, a clutch torque $T_{C2}$ is produced in the clutch 27. The clutch 27 is provided in parallel with the carrier 24 and the second sun gear 22 of the central differential 20. Accordingly, the torque is transmitted from the second sungear 22 to the carrier 24 to increase the torque to the front wheels 9. Thus, the distribution ratio of the front torque and the rear torque $T_F : T_R$ becomes $T_{F2} : T_{R2}$ at a point P2 of FIG. 4a. To the contrary, the torque to the rear wheels 13 is reduced to eliminate slipping, thereby improving driveability to ensure good operability and safe driving.

When the slip ratio S becomes larger than the value Sa ($S \geq Sa$) and the driving is extremely unstable, the differential operation restricting torque Tc becomes maximum. Thus, the carrier 24 is directly engaged with the second sun gear 22 to lock the central differential 20. Thus, completely coupled four-wheel driving is established in accordance with the torque ratio distribution ratio 50:50 corresponding to the axle loads of the front and the rear wheels 9, 13 at a point P3 of FIG. 4a. Thus, the torque distribution is continuously controlled in accordance with the slipping condition for preventing the wheels 9, 13 from slipping.

During the above-described four-wheel driving, the driving conditions are determined in the fixed distribution determining section 56 in accordance with the throttle opening degree $\theta$, the steering angle $\psi$, the vehicle speed V and the output signals from the switches 44 and 45. If the throttle opening degree $\theta$ becomes large by depressing an accelerator pedal of the vehicle at low vehicle speed, the rapid acceleration determining means 56a determines the rapid acceleration and produces a rapid acceleration signal which is applied to the correcting section 57. In the section 57, the restricting torque Tc is corrected to a maximum value $T_{CM}$. Accordingly, the central differential 20 is locked to provide the directly coupled four-wheel driving system, thereby ensuring the accelerability. If a steady high-speed driving and large steering angle at low vehicle speed are determined in the means 56b and 56c respectively, the clutch torque $T_C$ is corrected to zero in the correcting section 57. The central differential 20 is free to fix the torque distribution ratio applied to the rear wheels to a predetermined larger value than that to the front wheels. Thus, the steering response is improved and tight corner braking is prevented.

If the brake switch 44 is closed, a signal is applied to the braking operation determining means 56d where the braking is determined. In the section 57, the restricting torque $T_C$ is corrected to a set value $T_{C2}$. Thus, the torque distribution is fixed so as to prevent skidding of the wheels. When the idle switch 44 is closed, a signal from the idle switch is applied to the deceleration determining means 56e in which the deceleration is determined. Thus, the torque distribution ratio is fixed so as to obtain an engine braking effect which is equally applied to all four wheels. If ABS operation is determined in the ABS operation determining means 56f, the restricting torque $T_C$ is corrected to a low set value $T_{C1}$. Thus, the ABS is effectively controlled in accordance with the corrected torque distribution ratio.

In accordance with the present invention, since large torque is transmitted to the rear wheels through the central differential, driving stability for the four-wheel drive system as well as cornering stability are improved.

The rear-wheel slip ratio is calculated to determine the differential operation restricting clutch torque for controlling the torque distribution. Since the necessary minimum torque is transmitted to the front wheels for preventing slipping, stability and steerability of the vehicle are enhanced.

Furthermore, driving conditions such as rapid acceleration, steady high-speed driving, large steering angle at low speed driving, brake operation, deceleration and ABS operation are respectively determined and the torque distribution ratio is properly fixed corresponding to the detected driving condition. Thus, the proper operability is provided for the respective driving conditions. In addition, the driving conditions for the fixed torque distribution are effectively determined in the wide range.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. In a system for controlling torque distribution to front wheels and rear wheels of a motor vehicle having a transmission, a central differential for distributing output torque of said transmission to the front wheels and the rear wheels, the system comprising wheel speed sensing means for sensing front and rear wheel speeds for producing front and rear wheel speed signals respectively, an idle switch for producing an idle signal when an engine of the vehicle is idling, a brake switch for detecting a braking operation of said vehicle and producing a braking signal, and a fluid-operated restricting device for restricting differential operation of said central differential so as to change torque distribution ratio of the front wheels to the rear wheels, the improvement in the system wherein:

said central differential is arranged to distribute a larger torque to the rear wheels than to the front wheels;

the system further comprising:

first calculator means responsive to said front and rear wheel speed signals for calculating a slip ratio of the rear wheels;

torque setting means for setting a restricting torque of said fluid-operated restricting device to a value which increases with an increase of said slip ratio, said fluid-operated restricting device restricting said differential operation of said central differential in dependency on said restricting torque;

braking operation determining means responsive to said braking signal for producing a first positive condition signal to reset said restricting torque to a first predetermined value when a braking operation is detected, and for producing a first negative condition signal and maintaining said restricting torque if said first positive condition signal is absent respectively;

deceleration determining means responsive to said idle signal for determining deceleration of said vehicle and for, only when said first negative condition signal is produced, producing a second positive condition signal to reset said restricting torque to a second predetermined value if a deceleration is determined, and maintaining said restricting torque if said second positive condition signal is absent;

torque resetting means responsive to a respective one of said first and second positive condition signals for resetting said restricting torque to said predetermined values of reset restricting torque for various vehicle conditions; and control means responsive to said reset restricting torque for operating said fluid-operated restricting device so as to enhance stability and steerability of the vehicle.

2. The system according to claim 1, further comprising a steering angle sensor for sensing steering angle of said vehicle and producing a steering angle signal;

second calculator means responsive to said front and rear wheel speed signals for calculating speed of said vehicle and producing a corresponding vehicle speed signal;

large steering angle at low speed determining means responsive to said steering angle signal and said vehicle speed signal for determining a steering angle which is larger than a predetermined steering angle at a speed which is lower than a predetermined vehicle speed and for producing a third positive condition signal to reset said restricting torque to a third predetermined value of substantially zero if said first and second positive condition signals are absent; and said torque resetting means is further responsive to said third positive condition signal for resetting said restricting torque.

3. In a system for controlling torque distribution to front wheels and rear wheels of a motor vehicle having a transmission, a central differential for distributing output torque of said transmission to the front wheels and the rear wheels, the system comprising wheel speed sensing means for sensing front and rear wheel speeds for producing front and rear wheel speed signals respectively, an idle switch for producing an idle signal when an engine of the vehicle is idling, a brake switch for detecting a braking operation of said vehicle and producing a braking signal, and a fluid-operated restricting device for restricting differential operation of said central differential so as to change torque distribution ratio of the front wheels to the rear wheels, the improvement in the system wherein:

said central differential is arranged to distribute a larger torque to the rear wheels than to the front wheels;

the system further comprising:

first calculator means responsive to said front and rear wheel speed signals for calculating a slip ratio of the rear wheels;

torque setting means for setting a restricting torque of said fluid-operated restricting device to a value which increases with an increase of said slip ratio, said fluid-operated restricting device restricting said differential operation of said central differential in dependency on said restricting torque;

an anti skid brake system for preventing the wheels from skidding and for producing an ABS signal, ABS operation determining means responsive to said ABS signal for producing a first positive condition signal to reset said restricting torque to a first predetermined value when said anti skid brake system is operated, and for producing a first negative condition signal and maintaining said restricting torque if said first positive condition signal is absent;

braking operation determining means responsive to said braking signal for producing a second positive condition signal to reset said restricting torque to a second predetermined value when a braking operation is detected when said first negative condition signal is produced and respectively for producing a second negative condition signal and maintaining said restricting torque if said first and second positive condition signals are absent;

deceleration determining means responsive to said idle signal for determining deceleration of said vehicle and for, only when said first and second negative condition signals are produced, producing a third positive condition signal to reset said restricting torque to a third predetermined value if a deceleration is determined, and maintaining said restricting torque if said third positive condition signal is absent;

torque resetting means responsive to a respective one of said first, second and third positive condition signals for resetting said restricting torque to said predetermined values of reset restricting torque for various vehicle conditions; and control means responsive to said reset restricting torque for operating said fluid-operated restricting device so as to enhance stability and steerability of the vehicle.

4. The system according to claim 3, further comprising a throttle position sensor for sensing opening degree of a throttle of the engine of said vehicle and producing a throttle opening degree signal;

second calculator means responsive to said front and rear wheel speed signals for calculating speed of said vehicle and producing a corresponding vehicle speed signal;

rapid acceleration determining means responsive to said throttle opening degree signal and said vehicle speed signal for determining acceleration of said vehicle which is greater than a predetermined acceleration at a vehicle speed which is lower than a predetermined low vehicle speed and for producing a fourth positive condition signal to reset said restricting torque to a fourth predetermined value of maximum value of said restricting torque when said first and second negative condition signals are produced and said third positive condition signal is absent;

ordinary high vehicle speed driving determining means responsive to said vehicle speed signal for determining ordinary high vehicle speed of said vehicle and for producing a fifth positive condition signal to reset said restricting torque to a fifth predetermined value of substantially zero when said first and second negative condition signals are produced and said third and fourth positive condition signals are absent;

a steering angle sensor for sensing steering angle of said vehicle and producing a steering angle signal;

large steering angle at low speed determining means responsive to said steering angle signal and said vehicle speed signal for determining a steering angle which is larger than a predetermined steering angle at a vehicle speed which is lower than a predetermined vehicle speed and for producing a sixth positive condition signal to reset said restricting torque to a sixth predetermined value of substantially zero if said first through fifth positive condition signals are absent; and said torque resetting means is further responsive to a respective one of said fourth, fifth and sixth positive condition signals for resetting said restricting torque.

* * * * *